UNITED STATES PATENT OFFICE.

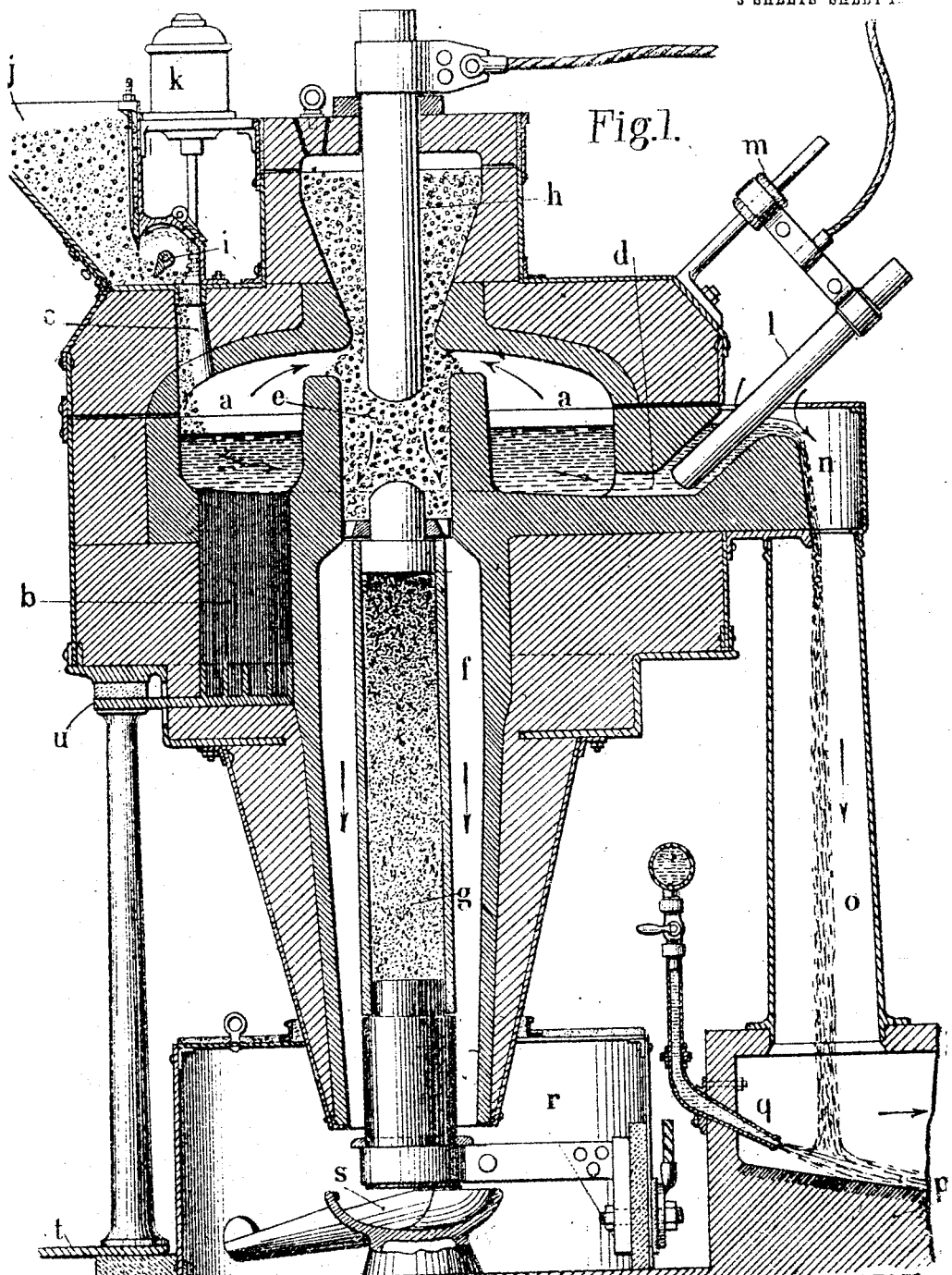

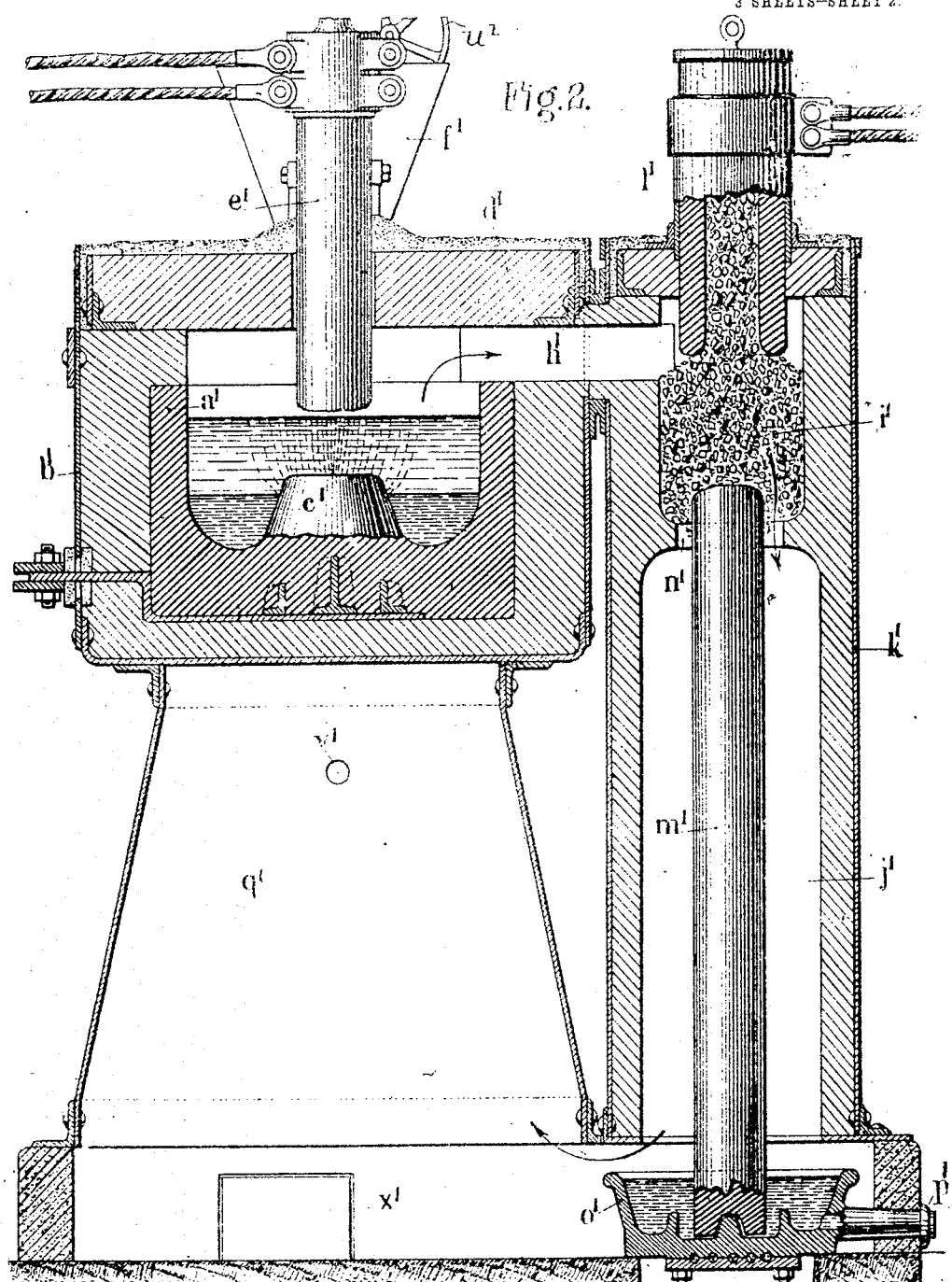

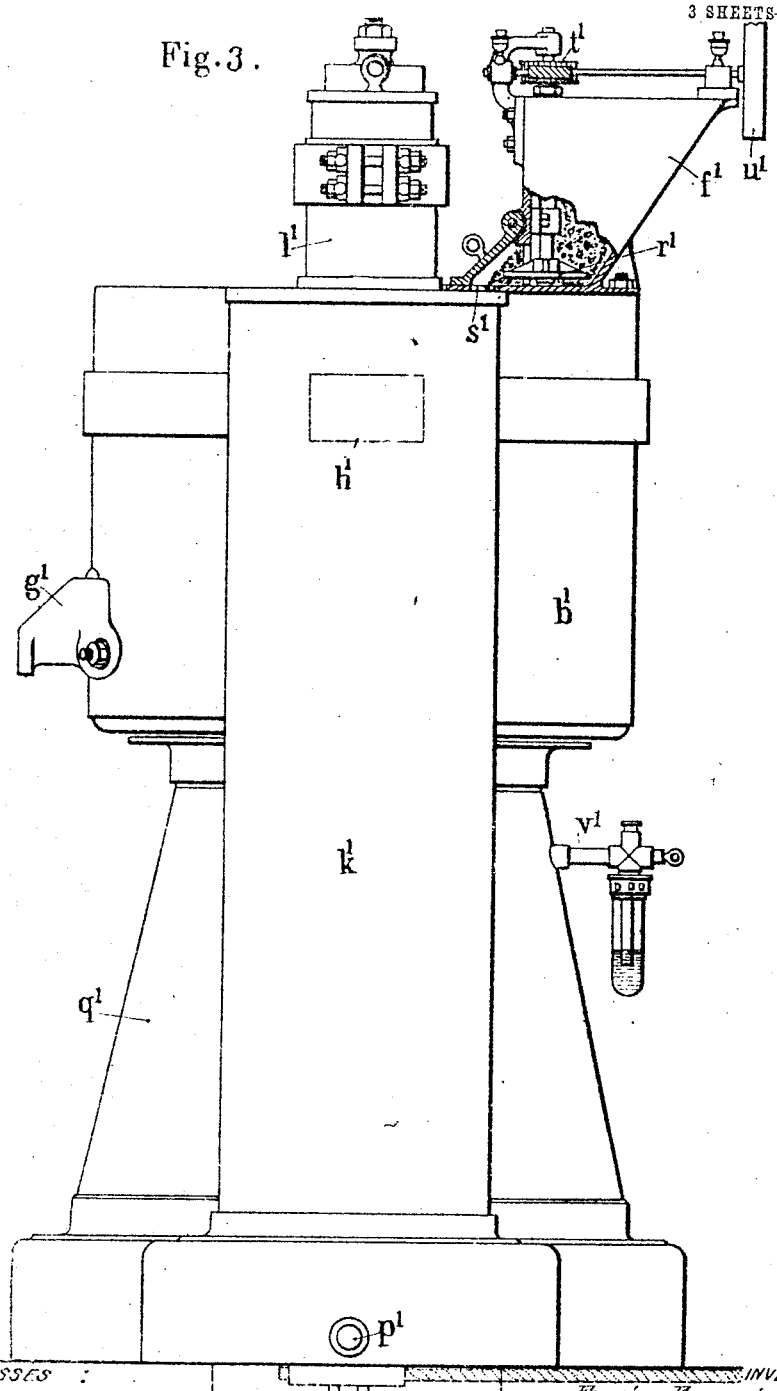

EUGÈNE FRANÇOIS CÔTE AND PAUL RAMBERT PIERRON, OF LYON, FRANCE.

ELECTRIC FURNACE FOR THE CONTINUOUS EXTRACTION OF ZINC FROM ITS ORES.

980,763.  Specification of Letters Patent.  Patented Jan. 3, 1911.

Application filed August 15, 1908. Serial No. 448,411.

*To all whom it may concern:*

Be it known that we, EUGÈNE FRANÇOIS CÔTE, of 24 Rue Sully, electrical engineer, and PAUL RAMBERT PIERRON, of 1 Rue d'Algérie, electrical engineer, both of Lyon, Rhône, Republic of France, have invented an Electric Furnace for the Continuous Extraction of Zinc from Its Ores, of which the following is a full, clear, and exact description.

Up to the present time, it has not been possible to simultaneously realize the three important conditions upon which the economy of the zinc metallurgy by the dry process is based, and which are as follows: 1st complete condensation of the metal; 2nd utilization of the whole heating power supplied; 3rd continuous distillation of the zinc.

Considering, for example, the case in which blendes are to be treated, two methods of treatment exist, as is well known.

The one process, the so-called roasting and reducing process, consists in roasting the ore so as to convert the sulfid into oxid which is then reduced by coal; the other one called precipitating process, consists in removing directly the zinc from its sulfid by a common metal, such as iron.

Heretofore, the roasting and reducing process was the only one used. In fact, according to the precipitating process, the melting of the blende with iron must be effected in a closed vessel. The retorts containing the reactive mixture must have thick walls, whereas these walls are attacked by the slags which are formed, and also by the iron sulfid; it results in a bad utilization of the heat which is transmitted to the interior of the retorts only with difficulty. In order that the heating power should not be too greatly reduced, there has arisen a custom of giving to these retorts small sizes and to increase their number, which means a complication of the furnace and a discontinuity in the operations. Finally, the treatment of the iron sulfid was not practical with the known metallurgical processes. Therefore, the precipitating process was inapplicable with the coal furnaces. Accordingly the roasting and reducing method was used. This method however has various disadvantages essentially due to the bad transmission of heat through the walls of the retorts to the discontinuity of the operations and to the difficulty of condensing the zinc carried along into a current of carbonic oxid.

The electric furnace has already been applied to the roasting and reducing process, which has improved this process particularly in what concerns the utilization of the heating energy. But, even in this case, the continuity of the operations can be scarcely obtained on account of the difficulty to evacuate by melting the exhausted charges. Furthermore, this method shows the same disadvantage as in the heating by coal to effect the condensation of the zinc in a current of carbonic oxid and the waste of zinc is more considerable in the case of an electric furnace than in the case of a coal furnace because then the condenser is difficultly maintained in the limits of temperature within which a good condensation of the zinc can be obtained.

The present invention relates to an electric furnace in which the zinc ore is treated by the so called precipitating process according to which the zinc is displaced by the iron, thereby allowing to realize the three essential conditions as above mentioned. In fact, the treatment in the new furnace combined with the great thermic output the advantages of the continuity of the process and of the condensation of zinc in the absence of carbonic oxid. The operation can be continuous whereas the iron sulfid being very fusible may be eliminated at same time as the slags which have been rendered fusible by the addition of suitable fluxes. The exhaust of the batches can therefore be effected in a continuous manner and without causing air to reënter the furnace. The charges may be introduced in a continuous manner also without causing air to reënter. On the other hand, the volatilized zinc reaches the condenser in the absence of any other gaseous product and condenses itself more completely. Furthermore, as the zinc is displaced from its sulfid without any great expense of power, it will be seen that the three advantages of the continuous operation, of the economy and of the complete condensation of the zinc are obtained. It is further to be observed that one may in this way treat directly poor blendes which it was necessary to enrich before the treatment with the old processes. On the other hand, as electric power is available it is easy to treat the sulfid of iron in order to recover iron.

A very important point is that of the condensation of the zinc vapors in the condenser. It is well known that condensation takes place only between the two limits of 430° and 560° C. Above 560°, there is no condensation; beneath 430°, the zinc will condense into powder. It is therefore necessary to maintain the condenser between these two limits of temperature. However, in the present case, in which the treatment is effected in the electric furnace, the radiation of the furnace cannot be relied upon as is the case with coal furnaces, nor upon the heat emitted by the gases generated in the furnace, in order to maintain the condenser at a suitable temperature. For the purpose of regulating at will and under the best conditions, the temperature of the condenser, the same is provided with a special electric heating appliance enabling the operator to regulate at will the temperature and to obtain furthermore different temperatures in the several parts of the condenser. This device is preferably constituted by a heating column arranged in the axis of the condenser and traversed by an electric current which heats the same by the Joule effect; this column may comprise parts of unequal electric resistance which heats more or less the several parts of the condenser.

The invention also comprises a device by means of which in case at the same time zinc vapor, zinc oxid, would be evolved from the furnace, which zinc oxid would be formed either by the presence of steam, or by carbonic acid introduced with the charges of ore, the metallic vapors would pass before entering into the condenser over a column of coal rendered incandescent by the passage of the electric current. Under these conditions, the oxidized metal is reduced and only zinc vapors and a little carbonic oxid enter the condenser.

The accompanying drawing shows by way of example several forms of construction of the new electric furnace.

Figure 1 is a vertical section of the new furnace. Figs. 2 and 3 show a modified form in vertical section and in elevation.

As represented, the furnace is essentially constituted by a channel-shaped retort or a circular channel $a$ covered with an arch and surrounded with a thick lining of fire-bricks located in a metal armature which is of a cylindrical shape and can be taken to pieces. It operates exclusively as a resistance furnace. In the case of the treatment of the crude blende by the iron, there is in fact an advantage in effecting the melting of the charges by the Joule effect only; the evaporation by the electric arc of iron silica, and of sulfids which soil the distilled zinc and complicate its purification is thereby avoided.

The current is led into the crucible through electrodes one of which is represented at $b$ formed each by block of graphite carbons located in the brickwork.

The drawing shows a furnace operating with a three phase current and comprising consequently three similar electrodes; the matter melting in the circular vat $a$ forms the resisting conductor receiving the three phases of the current. The bottom of the crucible is slightly inclined toward the taphole $d$. The charge introduced at $c$ melts and passes through the crucible in running toward this outlet.

The metallic vapors issuing from $a$ are obliged to traverse the column of incandescent coal $e$ to get into the condenser $f$ arranged in the axis of the furnace. The distillation thus takes place *per descensum* in the direction of the arrows.

The axis of the condenser which is a wide cylindrical tube is occupied by a column $g$ of refractory materials filled with coal or graphite dust which is more compressed at the top than at the bottom, so as to constitute a somewhat resisting electric conductor which becomes heated a little more at the bottom than at the top; the current reaches this column and leaves it through suitably arranged graphite blocks. After having traversed it as well as the carbons $e$ maintained in an incandescent state by a suitable adjustment, the electric current leaves this apparatus through an electrode $h$ passing down along the axis of a closed hopper arranged over the vault of the furnace and containing a coal supply for several days' work. As the combustion which is very slow proceeds, this coal descends at $e$ and the ashes fall down to the bottom of the condenser.

The system of electric resistances formed by $e$. $g$. $h$ is put in circuit over a transformer of varying connections so as to fulfil conveniently and at will the conditions of voltage and amperage which are required to obtain the suitable effects of temperature. The electrode $h$ can be maintained immovable during the operation; it is lowered for the purpose of taking up wear only when the stoppers of the hopper are removed to supply the latter again.

The mechanism for the continuous introduction of charges consists in a small metal spattle $i$ keyed upon an horizontal shaft and rotating in a closed drum with much play between it and the walls of this drum; this drum communicates on the one hand with the loading orifice of the furnace and, on the other hand, with an hopper in which an elevator, not shown, throws over the charges. The ore forms above the orifice c a talus or slope in which the spattle i dips at every revolution to take a certain quantity which is immediately pushed into this orifice. A small electric motor k causes the spattle i to rotate. The delivery of this loading or charging apparatus is regulated at will simultaneously by the rotary speed of the spattle and by a small sliding valve which can be moved vertically in front of the hole connecting the hopper with the drum, thereby controlling quantities of charges taken off by the spattle. The apparatus thus constituted is simple, very strong, readily adjustable and capable of continuously charging the furnace without causing any air to reënter.

It is important that provision be made for continuously tapping off the sulfid of iron and the slags. To this purpose, the furnace comprises an electrode l which projects into the tap hole arranged as a siphon in the thickness of the furnace wall. This electrode is connected with b and the intensity of the current passing through the same and required for maintaining the sulfid of iron and the slags in a very fluid state in the orifice d and the siphon is regulated according to the working of the furnace by a suitable combination of the electric current generating apparatuses.

While the sulfid of iron is run off, sulfurous acid is formed in contact with air and zinc oxid fumes resulting from the withdrawal by the slags of small quantities of free and nondistilled zinc are produced. To get rid of these gases and fumes which are a source of great trouble for the workmen, the tapping nozzle is caused to open in a chest in connection with a cast iron pipe o through which the molten matters coming out of the furnace axially fall. A strong draft generated by a fan arranged at the bottom of this pipe exhausts in the direction of the arrows the sulfurous gases and the zinc oxid fumes to direct them into absorption shafts.

In order to avoid the very painful labor consisting in removing from the furnace room the sulfid of iron and the incandescent slags, the mass of molten material flowing in a stream axially of the pipe o falls upon a powerful water spray directed by a nozzle q along the inclined bottom p of a closed channel arranged beneath the pipe o. The sulfid of iron and the slags are thus reduced into rough sands carried along by the water stream into decantation tanks. The evolved steam is exhausted by the draft.

The furnace is completed by a sheet iron bell r in which the lower part of the condenser f projects. The zinc vapors which escape from the condenser settle themselves in the form of dusts in this vat, the cover of which can be easily dismounted.

The distilled zinc falls into a receptacle s provided with a long channel leading the fluid metal outwardly.

The current comes to the electrodes b through the bars u, the supporting columns of the furnace and the conductors t.

It is to be observed that the adopted arrangements have for effect to utilize the whole of the heat produced by the furnace in maintaining the condenser in a hot state, so as to reduce as much as possible the quantity of current used for heating this apparatus. This furnace being tight closing at the same time does away with the readmission of air and the production of fumes which are dangerous for the workmen.

In the foregoing, the furnace has been considered as being fed by an alternating current. The same may also be fed by direct current. However, it must be observed that this furnace is particularly well adapted for the utilization of three phase currents working in resistance by the fact that the molten material forms a ring connecting the three electrodes in presenting between each of them pieces of conductors which have very approximately the same resistance and avoiding the difference of phase.

Figs. 2 and 3 show another arrangement in which the furnace comprises a cylindrical crucible of refractory and insulating materials: magnesia, chalk, dolomite, etc., with an inner lining a' of carborundum or chromite, the whole being contained in a sheet-iron vat b'. This crucible is provided at its center with a protuberance c' so that it has the form of the bottom of a bottle; electric conductors insulated from all the other parts of the apparatus terminated by prongs embedded in carborundum or chromite connecting the crucible with one pole of the circuit. The arch or vault is formed by a movable cover d' made of the same materials as those forming the exterior of the vat a'. The other pole of the furnace is constituted by the vertical electrode e' which can be vertically displaced by hand or mechanically and which centrally traverses the arch. All the joints between this cover and the vat, on the one hand, and the electrode, on the other hand, are made tight by a layer of powdered refractory materials packed upon these joints.

The charges (formed of the mixture of ore, of minute grains, of iron or cast iron and of fluxes) are introduced in a continuous and adjustable manner into the crucible by an orifice through the vault near the point of the electrode e' by means of a distributing mechanism f' (Fig. 3). The tappings or runnings of sulfid of iron and of slags are effected through an orifice leading to an external channel g'.

The lining of the crucibl with chromite or carborundum is done for the following reasons: The refractory materials such as magnesio, lime, bauxite, dolomite, alumina, etc., in addition to that they form fusible silicates with the gangue of the ore are more or less soluble in the sulfid of iron, therefore they cannot be used. On the other hand, the graphite or the electrode carbon give in contact with iron very fluid cast irons which in virtue of its great density instantaneously falls to the bottom of the crucible under the bed of iron sulfid so that some of the iron escapes the reaction upon the blende and the walls of the crucible are quickly attacked. On the other hand, as it is necessary to mold the crucible of a single piece and of a single material in the whole part which should contain the molten baths, in order to avoid the dislocations due to inequalities of expansion between different materials and so, furthermore the refractory material used must be electrically conductive, carborundum or chromite is used. Of course, the lining can consist of any other material which will be capable of resisting temperatures of from 1600° to 1800° in the presence of silica, of iron and of sulfid of iron, while offering an electrical resistance of substantially the same magnitude as that of carborundum.

The special arrangement of the bottom of the crucible gives a very important result: The whole of the interior of the crucible being conductive, if the bottom was of the usual shape, the electric current supplied from the electrode $e'$ to the center of the surface of the molten bath would pass to the walls in radiating through the upper layers and then the heating of the bath and of the walls would not be correctly effected. It is advisable to direct the flow of current through the batches so as to melt same according to a core in the axis of the crucible. This result is obtained with the protuberance $c'$ bringing to a maximum the density of the current in the region of the dotted lines represented Fig. 1 and which is the most conductive by the fact that it has the highest temperature. In this way also, the walls are always maintained at a temperature which is more uniform and somewhat lower than that of their fusion temperature so as to insure the good preservation thereof. Finally, the sulfid of iron which when formed has no longer to receive the heat and must only be maintained fluid has not to undergo here the action of the current, and therefore the electrothermical yielding is improved. The furnace works at same time by resistance and with an arc, because while the point of the electrode $e'$ does not come in contact with the bath, the interval in which the arc is produced being rendered conductive by the metallic vapors.

The volatilized zinc passes through the channel $h'$ over a layer of incandescent coal $i'$ which it must traverse before coming to the condenser $j'$ formed of a large vertical cylinder $k'$ of sheet iron having an inner lining of refractory earth. The coal is introduced at $i'$ through the hollow electrode $l'$. The electric current passes through this coal, bringing same to incandescence and passes out through the electrode $m'$ which is in the axis of the condenser, the system being branched in series upon a transformer of varying connections. The resistance of the column $m'$ is such that this conductor will be brought to red heat and will maintain the walls of the condenser at a suitable temperature.

The composition of the electrode $m'$ is such that its resistance is not uniform over its whole length but greater at the bottom than at the top so as to exactly distribute the heating according to the requirements of the condenser.

The coal ashes pass with the zinc vapors through orifices $n'$ provided between teeth forming a grate and maintaining the conductor $m'$ in the vertical position. The metal which is condensed over the walls of $j'$ falls into a vat $o'$ of cast iron, the latter being silicious and highly carbureted so as not to be capable of being attacked by the molten zinc, the bottom of this vat carrying the lower end of the conductor $m'$; the electric current passes out of the vat through conductors connected thereto and the zinc maintained in a fluid state by the heating of the electrode establishes the passage of the current from the latter to the conductors.

The passage of the metallic vapors through the layer of incandescent coal $i'$ has for effect to reduce the oxid of zinc which might have been formed, so that in the condenser only arrive zinc vapors in an atmosphere of carbonic gas.

The metal running over the walls of the condenser contains some impurities formed of silica, iron and metals alloyed with zinc in the blende; it is necessary to submit it to a refining melting so as to deprive it therefrom. For this purpose, the metal is received according to its condensation in the vat $o'$ in which it is maintained in a fluid state during a sufficient time under the heating action of the electric current passing through the same. The scums ascend to the surface of the bath in which they are mixed with coal ashes coming from $i'$ and are discharged in the wide closed space surrounding the vat $o'$ and from which they are withdrawn from time to time through suitably arranged orifices. Commercially pure zinc is drawn off by the pipe $p'$.

Everything that escapes the condensation under the form of dusts passes with the carbonic oxid into the large metallic bell $q'$ used at same time as a support for the furnace. The carbonic oxid passing out through the orifice $v'$ provided with a water valve eration. The dusts are deposited upon the bottom of the bell $q'$ from which they are emptied through doors $x'$.

The above indicated mechanism for the introduction of charges $f'$ is composed of a metallic hopper (Fig. 3) with plane walls, the one of which is vertical, secured upon the top of the furnace and at the bottom of which rotates a horizontal disk $r'$ of steel provided with some radial ribs. This disk projects through an opening provided in the vertical wall of the hopper and through which the one forms a slope which ends through a channel at the inlet orifice $s'$ provided in the vault of the furnace near the electrode $e'$. A hinged shutter with tight joints closes, in following the inclination of the slope, the top of the channel containing the same. This disk $r'$ is pivotally suspended at the top and its rotary motion is controlled by a tangential gearing $t'$ and a pulley $u'$. In turning at a greater or smaller speed, the disk $r'$ causes a greater or smaller quantity of ore to slide into the furnace per unit of time. This device is thereby characterized that it has no delicate part heated by the contact with zinc vapors, that it has no dead space in which zinc powder may form itself, so as to allow its rapid clearing in case of clogging.

The condenser need not necessarily have the form of a vertical cylinder nor be heated by the Joule effect; it can for instance be of an ovoid internal shape and heated by the radiation of an electric arc placed near one of the foci of this capacity. The essential point is that it can be electrically heated by a device permitting to regulate its temperature at will and according to the operation of the furnace.

The above arrangements have been given by way of example only; the forms, dimensions and detail arrangements may vary in all cases without modifying the principle of the invention.

Claims:

1. In an electric furnace of the character specified, a closed retort of annular form, a protuberance at the center of the bottom of the retort, two oppositely arranged electrodes placed in the axis of the retort, a condenser in connection with the retort and formed by a vertical cylinder in which is arranged an electrode.

2. In an electric furnace of the character specified, a closed annular retort, a condenser formed by a vertical cylinder arranged in the axis of the furnace, an upper electrode formed by a block of graphite arranged in the axis of the retort, and a lower electrode placed at the center of the condenser.

3. In an electric furnace of the character specified, a closed annular retort, a condenser formed by a vertical cylinder arranged in the axis of the furnace, an upper electrode formed by a block of graphite arranged in the axis of the retort and a lower electrode in the condenser and a resistance element in the condenser formed by a tube full of carbon.

4. In an electric furnace of the character specified, a closed retort of annular form, a protuberance at the center of the bottom of the retort, two oppositely arranged electrodes placed in the axis of the retort, a condenser in connection with the retort and formed by a vertical cylinder in, which is arranged a resistance element, a tap-hole for the retort, and a water spray below the tap-hole and on to which molten metal from the retort falls.

5. In an electric furnace of the character specified, a closed retort of annular form, a protuberance at the center of the bottom of the retort, two oppositely arranged electrodes placed in the axis of the retort, a condenser formed by a vertical cylinder in which is arranged an electrode, a tap-hole, a water spray below the tap-hole and on to which molten metal from the retort falls and means for feeding the furnace.

6. In an electric furnace of the character specified, a channel shaped retort circular in form, a condenser in the axis of the retort, a pair of oppositely arranged electrodes in the condenser, a tap-hole at one side of the retort, means below the tap-hole for receiving and cooling the molten material, and means at the opposite side of the furnace for continuously feeding the material to the retort, said means comprising a continuously rotating shaft provided with a lateral wing or blade, and an inclined chute for the material, said shaft being arranged at the outlet of the chute.

The foregoing specification of our electric furnace for the continuous extraction of zinc from its ores, signed by us this 29th day of July 1908.

EUGÈNE FRANÇOIS CÔTE.
PAUL RAMBERT PIERRON.

Witnesses:
THOMAS N. BROWNE,
MARIN VACHON.